United States Patent Office 3,310,576
Patented Mar. 21, 1967

3,310,576
HYDROFORMYLATION CATALYST AND
PROCESS RELATING THERETO
Joseph Kern Mertzweiller and Horace Marion Tenney, Baton Rouge, La., assignors to Esso Research and Engineering Company, a corporation of Delaware
No Drawing. Filed Feb. 5, 1963, Ser. No. 256,258
8 Claims. (Cl. 260—439)

The present invention relates to a method of preparing hydroxylated and/or carbonyl derivatives from an olefin, carbon monoxide and hydrogen, in which a special complex is used as catalyst, and to a method of preparing such catalyst.

It is known to prepare oxygen-containing organic compounds by reacting an organic unsaturated compound containing olefinic unsaturation simultaneously with carbon monoxide and hydrogen in the presence of a catalyst consisting of a metal carbonyl. In this reaction, carbon monoxide and hydrogen are added to the olefin double bond, and inasmuch as many olefins isomerize during the reaction, mixtures of aldehydes are usually obtained. This method, however, has the inherent disadvantage of catalyst instability. Therefore, only by maintaining relatively high carbon monoxide-hydrogen pressure, i.e., 1000–2000 p.s.i.g., during the reaction, can decomposition of the catalyst be avoided.

There is also the added disadvantage of the necessity of employing a multi-stage operation in order to produce the alcohols desired. Thus, the prior art processes required an initial hydroformylation step, i.e., reaction of the olefin which carbon monoxide and hydrogen to form the corresponding aldehyde. The second step comprises the reaction of the resultant aldehyde with hydrogen to reduce the aldehyde to the desired final alcohol. This prior art practice also had the inherent disadvantage of a need for a large amount of high pressure equipment to accommodate the multi-stage process.

It has now been found that the use of a new type of catalyst in the above-indicated oxo-type reaction results in considerable advantages.

In accordance with the present invention, oxygen-containing compounds, i.e. hydroxylated and/or carbonyl derivatives, are prepared by reacting an unsaturated compound with carbon monoxide and hydrogen in the presence of a complex which contains a transition metal selected from Group VIII of the Periodic Chart of the Elements in complex bond with at least one carbon monoxide molecule, at least one biphyllic ligand which contains an atom selected from Group V–A of the Periodic Chart of the Elements, and a ligand consisting of a conjugated diolefin adduct wherein said diolefin is at least partially pi bonded to the transition metal.

Several advantages are realized by the practice of the present invention. By the use of the novel complex disclosed herein, the above-mentioned deficiencies are overcome. Thus, an improved hydroformylation process is provided wherein olefins may be converted at exceptionally low pressures, e.g., 5 to 50 atmospheres as compared to the usual 150 to 200 atmospheres. This surprising characteristic is partly due to the stability of the catalyst at low pressures, as well as at highly elevated reaction temperatures. Further, use of the novel catalyst of the instant invention provides for a process whereby a desired alcohol may be produced as the end product of a one-stage hydroformylation conversion rather than the two-stage conversion common to the prior art. A further advantage resides in the fact that such one-stage conversion naturally involves less equipment than heretofore and without the necessity for high pressure equipment.

As indicated above, the catalysts which render the conversion feasible are of unusual thermal stability and resistance to further reaction with impurities which adversely affect the conventional $Co_2(CO)_8$ catalyst. These properties are attributed at least partially to the unique pi bonding of the hydrocarbon ligand component, i.e., diolefin adduct. In addition, the catalysts of the present invention are highly hydrocarbon soluble, thus making a greater quantity by weight of complex available as potential catalyst source.

The catalyst complexes of the present invention are oxo-type catalysts which contain three different coordinating or ligand groups, one carbon monoxide, one a conjugated diolefin, and the other a molecule containing an atom selected from Group V–A of the Periodic Chart of the Elements.

The presence of these groups provide for unusual solubility, stability and selectivity properties. An additional and unexpected advantage resulting from the complexes of the present invention is the presence of the pi bonded diolefin ligand in the complex structure. Thus, the tendency to form this type of structure by using a reactant which normally deactivates the catalyst is negatived by using the olefinic monomer as shown hereinafter. The catalytic complex has the following general formula:

$$[CnH_{2n-1}] M(CO)_2 [(R_zA)_x-X-R_y]$$

wherein M is a transition metal selected from Group VIII, preferably cobalt, $n$ has a value of from 3 to 10, preferably 4 to 6, and the ligand $[(R_zA)_x-X-R_y]$ is as hereinafter set forth.

It has been determined reasonably well from infrared spectra that the catalyst may undergo further changes under reaction conditions. Thus, it is believed that this transition involves a reaction which leads to a structure which is substantially symmetrical in configuration. The structure resulting from such transition is believed to have the following proposed general formula which illustrates phosphorous as the Group V–A atom:

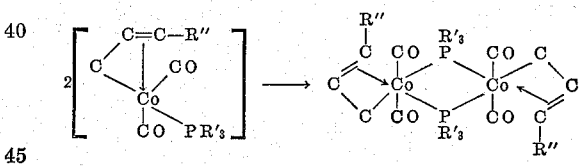

wherein R' represents the residue of said ligand, for example, alkyl or alkoxy groups and wherein R" represents a hydrogen atom or an alkyl group containing from 1 to 7 carbon atoms.

It should be understood, however, that the scope of the instant invention should be in no way restricted in view of the above-proposed formula.

The transition metal which is suitable for use as part of the complex employed as catalyst in the process set forth above is selected from Group VIII of the Periodic Chart, that is, the transition metal can be iron, cobalt, nickel, ruthenium, rhodium, palladium, osmium, iridium or platinum. Iron, cobalt and rhodium are the preferred transition metals, with cobalt being especially preferred.

The catalyst complex also contains one or more biphyllic ligands which contain an atom selected from Group V–A of the Periodic Chart, preferably trivalent phosphorus or arsenic with phosphorus being especially preferred. The three valences of such atom which is present in the ligand can be saturated by an organic group, preferably an aliphatic group. These groups can contain functional groups, for example, carbonyl, carboxyl, nitro, amino or hydroxyl groups or unsaturated carbon-carbon bonds. One organic group can be bound to more than one valence of the Group V–A atom, whereby a heterocyclic compound is formed. For example, two valences of the atom can be saturated by one alkylene group or dioxyalkylene group. The third valence of the atom can then be saturated by another organic group.

The biphyllic ligand can be polyvalent, that is, it can contain more than one Group V–A atom. Such ligands are called bivalent or trivalent if the number of such atoms present in the molecule is 2 or 3, respectively.

The biphyllic ligands containing a Group V–A atom which are suitable for use in the present invention can be characterized by the general formula:

$$(R_zA)_x—X—R_y$$

wherein X represents an atom selected from Group V–A, preferably phosphorus or arsenic, R represents hydrogen atoms or alkyl groups which suitably contain less than about 20 carbon atoms. A is oxygen, nitrogen or sulfur, $x$ has a value of 0 to 3, $y$ has a value of $3-x$ and $z$ is equal to 1 or 2.

If in the above formula X is phosphorus, $x$ is not equal to 0, and A is oxygen, the biphyllic ligand which forms part of the complex may be, for example, a phosphite, a phosphonite or a phosphinite. If A is nitrogen, the trivalent phosphorus compound can, for example, be an amido-phosphite or an amido-phosphonite, or an amido-phosphinite. It is preferable to employ biphyllic ligands in which A is oxygen and trialkyl phosphites which contain from 1 to 6 carbon atoms are particularly suitable for use in ligands complexed in the catalysts of the present invention.

If in the above formula $x$ is equal to 0, the biphyllic ligand is a phosphine or an arsine. The R group is preferably an alkyl group containing from 1 to 6 carbon atoms with trialkyl phosphines being particularly preferred.

Specific examples of the preferred ligands within the scope of the formula set forth above are:

Trimethylphosphine, triethylphosphine, tripropylphosphine, tributylphosphine, tripentylphosphine, trihexylphosphine, trimethylphosphite, triethylphosphite, tripropylphosphite, tributylphosphite, tripentylphosphite, trihexylphosphite, trimethylarsine, triethylarsine, tripropylarsine, tributylarsine, trimethylarsite, tributylarsite, and the like.

The conjugated diolefin which is part of the complex which is employed as the catalyst of the present invention can contain up to ten carbon atoms, preferably four to six carbon atoms. Aliphatic conjugated diolefins are preferred since certain cyclic conjugated diolefins can give rise to catalysts which are incompatible with mono-olefins in the $C_5$–$C_8$ range. Thus, butadiene, isoprene, piperylene, hexadienes, etc., are preferred as the conjugated diolefin component.

In broad terms, the complexes of the present invention are prepared according to the following sequence wherein cobalt is the transition metal used:

(1) Dicobalt octacarbonyl or an equilibrium mixture of dicobalt octacarbonyl and cobalt hydrocarbonyl is prepared in a conventional manner in a suitable inert diluent.

(2) The resulting mixture is reacted with a conjugated diolefin, at conditions of temperature and partial pressures of carbon monoxide and hydrogen such that substantially all of the cobalt is converted to the diolefin adduct of cobalt hydrocarbonyl.

(3) The product resulting from (2) is reacted with at least a stoichiometric quantity of a ligand, e.g., a trialkyl phosphine, such that one carbon monoxide group of the diolefin hydrocarbonyl complex is replaced.

The reactions in the above sequence can be represented by the following equations:

(a) $Co_2(CO)_8 + H_2 \rightleftharpoons HCo(CO)_4$
(b) $C_nH_{2n-2} + HCo(CO)_4 \rightarrow (C_nH_{2n-1})Co(CO)_3 + CO$
(c) $PR_3 + (C_nH_{2n-1})Co(CO)_3$
$\rightarrow (C_nH_{2n-1})Co(CO)_2(PR_3) + CO$ In the first step of the above sequence the carbonyls employed may be prepared from the salts of the catalytically active transition metal with high molecular weight fatty acids such as stearic, oleic, palmitic, naphthenic, etc. Thus, suitable starting materials are, for example, cobalt octoate, cobalt oleate or cobalt naphthenate. The metal carbonyls may also be prepared from forms of the transition metal such as the metal soap, metal oxide, carbonate, sulfide, the reduced metal and the like.

The first stage is carried out in an inert diluent, for example, n-hexane, n-decane, benzene, naphtha fractions, inert oxygenated solvents, and the like.

The synthesis gas mixture fed to the first stage may consist of any ratio of $H_2$ to CO, but preferably these two gases are present at about 1.0 volume hydrogen per volume CO. The reaction is conducted at pressures in the range of about 500 to 3,000 p.s.i.g., preferably 1,000 to 2,500 p.s.i.g. and at temperatures in the range of about 200° F. to 350° F.

In the second step a molar excess of conjugated diolefin is employed, preferably 1.5 to 10 moles of conjugated diolefin per mole of metal. The synthesis gas mixture fed to the second stage may consist of a ratio of hydrogen to CO of 1:1 to 20:1, preferably 5:1 to 10:1. The conditions for the use of the diolefin with the synthesis gas vary in accordance with the nature of the diolefin employed. However, the reaction in the second stage is generally conducted at pressures in the range of about 500 to 2,000 p.s.i.g., and the temperatures in the range of about 100 to 350° F. The ratio of synthesis gas to diolefin is generally not critical provided at least a fivefold excess of gas is present.

It is important in the method of preparing the catalyst complexes of the present invention that such complexes be produced in the sequence set forth above, i.e., formation of the metal hydrocarbonyl from the metal carbonyl with simultaneous conversion to the diolefin adduct of the metal hydrocarbonyl. When an equilibrium mixture of metal carbonyl and metal hydrocarbonyl is treated with diolefin, it is found that only the metal hydrocarbonyl reacts very rapidly, thus resulting in a mixture of the metal carbonyl and the diolefin adduct. Subsequent treatment with the compound containing the Group V-A ligand under the conditions set forth below then gives a mixture of the corresponding derivatives.

Generally, a stoichiometric excess of Group V-A ligand, based on the transition metal, is employed, although smaller quantities of ligand may be used if desired. Molar ratios of ligand to metal of 1/1 to 5/1 can be employed with satisfactory results. The temperature and pressure which are employed during this step are not especially critical and can vary within wide limits. Preferably a temperature of 50 to 250° F. is used and although pressures which are higher or lower than atmospheric can be employed at this stage, it is preferred to utilize atmospheric pressure. In general, even within the broad operating limits set forth above, a considerable quantity of complex or precursor is formed within 15 to 30 minutes reaction time. During such reaction there is a vigorous evolution of carbon monoxide accompanying the formation of the liquid product.

The catalyst complex is separated from the reaction mixture by conventional operation and is preferably washed with aqueous sodium bicarbonate, particularly if organic acid residues from metal soaps are present. Solvent removal from the resulting complex can be effected by vacuum distillation as well as other conventional means.

The preparation of the hydroxylated and/or carbonyl derivative is effected by reacting an olefin with hydrogen and carbon monoxide in the presence of the catalyst set forth above. While the reaction can be carried out under pressures of 50 to 3000 p.s.i.g., it is preferred that the sum of the hydrogen and carbon monoxide pressures is between 400 and 1500 p.s.i.g. Of course, if desired, higher pressures can be used. The temperature employed is between 200 and 500° F., preferably 300 and 450° F., with a temperature of 350 to 390° F. being particularly suitable.

The molar ratio between hydrogen and carbon monoxide generally will be 1:1 or greater. Preferred results are obtained, i.e., improved reaction velocity, product yield, etc., by increasing the ratio of hydrogen to carbon monoxide up to 2:1 and sometimes up to as much as 10:1. When the ratio of hydrogen to carbon monoxide is about 2:1, the resultant product primarily contains alcohols. On the other hand, a 1:1 mole ratio will result in a product predominantly aldehyde.

Generally, the molar ratio between the catalyst and the olefin reactant is not narrowly critical and can be varied within wide limits. It is found, however, that ratios of 1:1000 to 10:1 between catalyst and olefin will result in suitable reaction velocities. The use of solvents is not particularly critical to the present invention although inert solvents such as paraffinic or aromatic hydrocarbons can be employed.

Amenable to the reaction are straight and branch chained olefinic compounds, depending on the type of product desired. Not only olefins, but most organic compounds possessing at least one non-aromatic carbon to carbon double bond, may be reacted in the process of the present invention. The olefinic compounds contemplated include, among others, monoolefins, diolefins, aryl substituted olefins, cycloolefins, and the like. Mixtures of olefins and hydrocarbon fractions containing appreciable quantities of olefin may also be used as starting material, depending upon the nature of the final product desired.

It is also within the scope of this invention to add the conjugated dienyl complex of the active metal and the Group V ligand as separate components to the reaction vessel.

As used herein, the term "biphyllic ligand," defines a compound which can simultaneously form a coordination bond with a metal atom and accept electrons from said metal atom.

The Periodic Chart of the Elements referred to herein is that entitled as such and distributed by the Fisher Scientific Company of New York.

The invention is illustrated further by means of the following examples.

EXAMPLE I

*Preparation of 2-butenyl cobalt dicarbonyl tri-n-butyl phosphine from cobalt octoate*

A 300 cc. stirred autoclave was charged with 20 gms. of cobalt octoate solution (12% Co) and 100 gm. n-hexane. The system was purged, pressured to 1650 p.s.i.g. cold with synthesis gas (1.5/1 $H_2$/CO). On heating to 350° F. the pressure increased to 2200 p.s.i.g. During a 10-minute interval the pressure dropped to 1760 p.s.i.g. and sustained at this level during an additional hour of heating. The autoclave was cooled and a small sample withdrawn. Analysis showed 77% of the theoretical CO for the cobalt charged (assuming 4/1 ratio of CO/Co). The remaining cobalt was present as polymeric carbonyls, insoluble in the hexane medium.

Fourteen grams of butadiene was pressured into the cold autoclave and the pressure equilibrated at 880 p.s.i.g. After maintaining for 1 hour at about 80° F. the combined CO was still better than 90% of that present before the butadiene was added. This signifies either only a small percentage of cobalt in the form of HCo(CO)$_4$ or a very slow rate of reaction of the HCo(CO)$_4$ with the butadiene. Increasing the temperature to 122° F. for 1.3 hours (pressure increased and was steady at 920 p.s.i.g.) did not appreciably change the combined CO content. The temperature was increased to 212° F. and the pressure rose to 1030 p.s.i.g. Over a 15-minute interval at 212° F. the pressure further rose to 1110 p.s.i.g., indicative of gas liberation. At this point, the combined CO in solution analyzed 66% of that initially present before butadiene addition. No further changes in pressure were observed in 45 minutes additional heating. Infrared examination of the centrifuged liquid product showed very strong absorption bands at 4.82 and 5.02 microns. (Heck and Breslow, J. Am. Chem. Soc., 83, 1097 (1961), report strong bands at 4.85 and 5.03 microns for 2 butenyl cobalt tricarbonyl.) The relatively strong 5.40 micron band corresponding to the bridge carbonyl groups in $Co_2(CO)_8$ was completely absent, indicating that virtually all of the soluble cobalt was present at the butenyl cobalt tricarbonyl.

The autoclave was cooled and the product discharged into 8.5 grams of n-butyl phosphine. Considerable gas evolution was noted. After standing for about ½ hour the liquid product showed very strong infrared bands at 5.02 and 5.17 microns. (Heck and Breslow, Ibid., give very strong bands at 5.01 and 5.17 microns for the triphenyl phosphine derivative of 2 butenyl cobalt tricarbonyl.) There was also a strong acyl carbonyl band at 5.8 microns attributed to the octanoic acid formed from the anionic residue of the cobalt soap charged originally. This was removed by washing with an excess of aqueous sodium bicarbonate.

The soluble CO content of the washed, filtered product was 64% of that present before treatment with the tributyl phosphine. Theoretical value is 67%.

Removal of the hexane by vacuum gave 9.1 grams of relatively pure catalyst corresponding to a yield of 85% based on the $Co_2(CO)_8$ obtained from the soap.

EXAMPLE II

*Hydroformylation of $C_7$ olefin with catalyst prepared in Example I*

The 300 cc. stirred autoclave was charged with 4.5 gms. of the catalyst prepared in Example I and 100 gms. of $C_7$ olefin used in the commercial production of iso-octyl alcohol. After purging the autoclave was pressured with synthesis gas (about 1.5/1 $H_2$/CO ratio) to 500 p.s.i.g. and the temperature increased to about 385° F. during a period of 18 minutes. Initial gas absorption rate was 30 lbs./minute. The pressure was maintained at 500 p.s.i.g. as gas was consumed. The reaction was essentially complete in 4 hours. Samples withdrawn from the autoclave after 1 hour and 3 hours were analyzed by vapor phase chromatography with the following results:

| Sample HR | Wt. Percent Distribution | | |
| --- | --- | --- | --- |
| | $C_7$ Hydrocarbon | $C_8$ Aldehydes | $C_8$ Alcohols |
| 1 | 66.4 | 1.2 | 31.4 |
| 3 | 37.2 | 5.3 | 57.0 |

Heavier materials amounted to 1% or less. The increase in aldehyde make with time is attributed to some change (increase in CO partial pressure) in gas composition. The aldehyde make can be maintained at 1% or less by maintaining the gas composition $H_2$/CO ratio at least 1.5/1.

EXAMPLE III

*Preparation of 2 butenyl cobalt dicarbonyl triethyl phosphite from cobalt oxide*

A slurry of commercial cobalt oxide, $Co_2O_3$ (29 gms.) in n-heptane (680 gms.) was heated in a 3 liter shaker autoclave at 300° F. under 3000 p.s.i.g. of synthesis gas (1.5/1 $H_2$/CO). The reaction is characterized by an induction period of somewhat variable length followed by a fairly rapid drop in pressure. The induction period and reaction are normally complete in two hours and essentially all of the cobalt is in solution as an equilibrium mixture of $Co_2(CO)_8$ and HCo(CO)$_4$.

One hundred eight grams of a dicobalt octacarbonyl-hydrocarbonyl solution prepared as above is charged to a 300 cc. stirred autoclave and treated 15 minutes at 300° F. and 1800 to 1900 p.s.i.g. of synthesis gas (1.5/1 $H_2$/CO). The autoclave is cooled to 120° F. and the pressure decreased to 500 p.s.i.g. Twenty-seven grams of butadiene is pressured into the autoclave and the pressure is increased with hydrogen to 1500 to 1600 p.s.i.g. The temperature is increased to 212° F. and the pressure stabilizes at about 1800 p.s.i.g. After 45 minutes on conditions the only infrared bands detectable in the metal carbonyl region are the bands at 4.82 and 5.02 microns which are characteristic of 2 butenyl cobalt tricarbonyl.

The product, after cooling, is withdrawn from the autoclave and in the absence of air is heated with 9 gms. of triethyl phosphite. There is a vigorous evolution of CO, but the product is soluble except for a small amount of sludge which is filtered off.

The filtered products from two such runs as described above were combined and stripped free of solvent in vacuum. Recovery was 31.5 gms. of dark, viscous liquid product equivalent to 85 mol. percent yield based on $Co_2(CO)_8$. A solution of the product in n-heptane shows strong infrared bands at 5.00 and 5.13 microns.

EXAMPLE IV

*Hydroformylation of hexene-1 with catalyst prepared in Example III*

The 300 cc. stirred autoclave was charged with 50 gms. of n-heptane, 50 gms. of hexene-1 and 1 gm. of the catalyst concentrate from Example III above. The hydroformylation reaction was carried out at 300° F. and an average pressure of 1410 p.s.i.g. (1.5/1 $H_2$/CO ratio). Initial gas absorption rate was 80 lbs./minute and this decreased to 2 lbs./minute after 75 minutes on conditions. The reaction was terminated after 80 minutes. The yield of product consisting of at least two aldehyde isomers was at least 80 mol. percent on olefin charged. The fact that the catalyst underwent certain changes is shown in that the principal infrared band of the product (metal carbonyl region) occurred at 4.93, 5.00 and 5.09 microns compared to the bands at 5.00 and 5.13 microns in the catalyst as charged. The small amount of unconverted olefin was present as the trans internal form, indicating some isomerization of the alpha olefin feed.

EXAMPLE V

*Preparation of methyl 2-pentenyl cobalt dicarbonyl tri-n-butyl phosphine*

The autoclave was charged with 110 gms. of dicobalt octacarbonyl solution prepared as in Example III. After equilibrating with 1.5/1 $H_2$/CO at 300° F. and 2000 p.s.i.g., the contents were cooled and depressured to 500 p.s.i.g. Twenty-eight grams of pure isoprene were pressured in with hydrogen and the pressure adjusted to 2000 p.s.i.g. with hydrogen. The autoclave was heated to 212° F., at which the pressure reached a maximum of 2220 p.s.i.g. and gradually decreased to 2040 p.s.i.g. after 45 minutes on temperature. After cooling and discharging, the contents of the autoclave amounted to 126.8 gms. This solution of methyl 2-pentenyl cobalt tricarbonyl showed strong infrared bands at 4.85 and 5.02 microns in the metal carbonyl region. The product was treated with 11.3 cc. of tri-n-butyl phosphine. Carbon monoxide was evolved quite rapidly, the reaction being complete in about one hour. The solution showed strong infrared bands at 5.01 and 5.17 microns in the metal carbonyl region. The solution contained an estimated 15 wt. percent free isoprene dissolved therein.

EXAMPLE VI

*Hydroformylation of octene-1 with catalyst prepared in Example V*

The autoclave was charged with a mixture of 6.5 gms. of catalyst solution from Example V and 90 gms. of octene-1. This mixture contained about 1 wt. percent free isoprene in solution (from the catalyst solution). The autoclave was pressured with 1/1 $H_2$/CO synthesis gas to 1040 p.s.i.g. and heated to 350° F. Pressure was maintained at about 1100 p.s.i.g. while maintaining a gas flow of about 0.6 liter/minute to maintain constant gas composition. A vigorous reaction with gas being absorbed at a rate of at least 60 lbs./minute was taking place within 5 minutes after operating temperature was reached. With conventional type catalysts and feeds containing 1% free conjugated diolefin, induction periods of at least 60 minutes are experienced at considerably higher pressures.

The run was terminated after 2 hours, at which time the gas absorption rate had decreased to 6 lbs./minute. The composition of the final product was as follows:

| | Weight percent |
|---|---|
| $C_8$ hydrocarbons | 7.3 |
| Low boiling aldehydes (at least 2 isomers) | 47.0 |
| High boiling aldehyde (probably n-nonyl aldehyde) | 29.0 |
| Alcohols (3 or more isomers) | 11.2 |
| Heavy products | 5.0 |

This product also showed an infrared (catalyst) band at 5.0 microns.

EXAMPLE VII

*Hydroformylation of $C_7$ olefin with catalyst prepared in Example V*

The hydroformylation was carried out as described in Example VI except that $C_7$ olefin (mixed isomers) was used in place of octene-1. The induction period was about 5 minutes, the initial gas absorption rate was 16 lbs./minute and the rate after 2 hours was 6 lbs./minute. The composition of the final prouct was 85% $C_7$ hydrocarbons, 13% $C_8$ aldehyde isomers and 2% $C_8$ alcohol. Because of the highly branched nature of this feedstock, it is 5 to 6 times less reactive than the linear octene-1. The product from this run showed infrared (catalyst) bands at 5.01 and 5.12 microns.

EXAMPLE VIII

*Preparation of cyclopentadienyl cobalt dicarbonyl triethyl phosphite*

The preparation was carried out as in Example V except that cyclopentadiene monomer (51.6 gms.) was used in place of isoprene. Prior to treating with triethyl phosphite, the solution showed infrared bands at 4.91 and 5.08 microns. The reaction of the cyclopentadienyl adduct with thiethyl phosphite did not evolve appreciable CO at room temeprature but slowly evolved CO when heated on the water bath (up to 180° F.). After the reaction with triethyl phosphite was complete, the catalyst showed infrared bands at 5.08 and 5.18 microns.

EXAMPLE IX

*Hydroformylation reactions with catalyst prepared in Example VIII*

The catalyst prepared in Example VIII was incompatible with olefins, either octene-1 or $C_7$ olefin. When the catalyst was mixed with the olefins in the proportions used in Example VI, a dark brown-green precipitate formed almost immediately. Most of the cobalt was in the precipitate.

A similar behavior was observed with cyclopentadienyl cobalt dicarbonyl tri-n-butyl phosphine and also dimethyl fulvenyl cobalt dicarbonyl tri-n-butyl phosphine.

What is claimed is:

1. The method for the preparation of a hydroformylation which comprises reacting a carbonyl of cobalt with a stoichiometric excess of a conjugated aliphatic diolefin having 4 to 6 carbon atoms at temperatures of about 100–350° F., under synthesis gas pressure of about 500– 3000 p.s.i.g., wherein the molar ratio of synthesis gas to diolefin is at least 5/1, and the partial pressure ratio of hydrogen to carbon monoxide in the synthesis gas ranges from 5/1 to 10/1, thereby converting substantially all of the cobalt carbonyl to the diolefin adduct of the cobalt hydrocarbonyl, and reacting the diolefin adduct with at least a stoichiometric amount of a biphyllic ligand having the generic formula:

$$[(R_ZA)_X—X—R_Y]$$

wherein X is phosphorous, R is selected from the group consisting of hydrogen atoms and alkyl groups having 1 to 6 carbon atoms, A is oxygen, $x$ has a value of 0 to 3, $y$ has a value of $3-x$ and $z$ has a value from 1 to 2.

2. The method of claim 1 in which the carbonyl is a member selected from the group consisting of dicobalt octacarbonyl and a mixture of dicobalt octacarbonyl and cobalt hydrocarbonyl.

3. The method of claim 1 in which the biphyllic ligand is trialkyl-phosphine.

4. The method of claim 1 in which the biphyllic ligand is trialkyl-phosphite.

5. A hydrocarbon soluble hydroformylation catalyst having the general formula:

$$[C_nH_{2n-1}]Co(CO)_2(PR_3)$$

in which $[C_nH_{2n-1}]$ is a conjugated aliphatic diolefin wherein $n$ is from 4 to 6 and R is an alkyl group having 1 to 6 carbon atoms.

6. A composition of matter having the general formula:

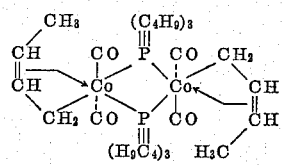

said composition having infrared absorption bands at 5.02 and 5.17 microns.

7. A composition of matter having the general formula:

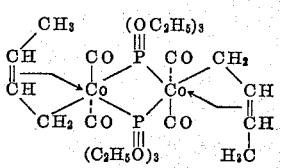

said composition having infrared absorption bands at 5.00 and 5.13 microns.

8. A composition of matter having the general formula:

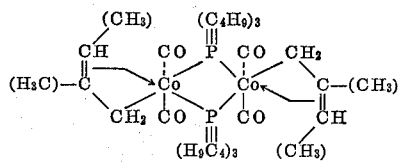

said composition having infrared absorption bands at 5.01 and 5.17 microns.

References Cited by the Examiner

UNITED STATES PATENTS

| | | | |
|---|---|---|---|
| 3,098,101 | 7/1963 | Aldridge et al. | 260—604 |
| 3,101,360 | 8/1963 | Parts et al. | 260—439 |
| 3,102,899 | 9/1963 | Cannell | 260—439 |
| 3,103,528 | 9/1963 | Tayler | 260—439 |
| 3,119,876 | 1/1964 | Jaros et al. | 260—604 |
| 3,125,594 | 3/1964 | Hubel et al. | 260—439 X |
| 3,130,237 | 4/1964 | Wald | 260—439 X |
| 3,137,715 | 6/1964 | Heck | 260—439 |
| 3,141,031 | 7/1964 | Wilkinson et al. | 260—439 |
| 3,168,553 | 2/1965 | Slaugh | 260—439 |

FOREIGN PATENTS 606,408  1/1962  Belgium.

OTHER REFERENCES

Akademiia Nauk. SSSR Izvestia, April 1962, pp. 722–724.

Bailar, J. C.: Chemistry of the Coordination Compounds, Reinhold Publishing Corp., New York, N.Y. (1956), p. 543.

Davison et al.: J. Chem. Soc. (London) pp. 3172–3177, August 1961.

Heck et al.: J.A.C.S., vol. 82, No. 16, Aug. 20, 1960, pp. 4438–4439.

Manuel et al.: Ibid., pp. 366–373.

Heck et al.: J.A.C.S., vol. 83, pp. 1097–1101 (1961).

Zeiss: Organo-Metallic Chemistry, A.C.S. Monograph Series, No. 147 (1960), pp. 484 and 502.

TOBIAS E. LEVOW, *Primary Examiner*.

LEON ZITVER, SAMUEL H. BLECH, HELEN M. McCARTHY, *Examiners*.

B. HELFIN, E. C. BARTLETT, T. L. IAPALUCCI, A. P. DEMERS, *Assistant Examiners*.